United States Patent [19]
Olivan

[11] 4,099,813
[45] Jul. 11, 1978

[54] TRUCK CAB CADDY

[76] Inventor: Andre J. Olivan, 1973 Dora Ave., Walnut Creek, Calif. 94596

[21] Appl. No.: 672,085

[22] Filed: Mar. 31, 1976

[51] Int. Cl.² ............................................. A47F 7/00
[52] U.S. Cl. .................................... 312/243; 312/245; 211/55; 211/88
[58] Field of Search ............... 312/243, 278, 279, 280, 312/237, 245; 220/18; 211/88, 55, 50, 42; 248/300

[56] References Cited

U.S. PATENT DOCUMENTS

| D. 67,209 | 5/1925 | Kaufman | 211/88 X |
|---|---|---|---|
| D. 168,746 | 2/1953 | Laciura | 211/88 X |
| D. 191,924 | 12/1961 | Meade et al. | 211/88 X |
| 1,556,514 | 10/1925 | Feldman | 211/55 |
| 1,664,321 | 3/1928 | Quist | 248/300 |
| 1,987,822 | 1/1935 | Gregory | 312/243 |
| 2,532,600 | 12/1950 | Broersma | 211/55 |
| 2,546,459 | 3/1951 | Lee | 312/245 |
| 2,821,321 | 1/1958 | McQuiston et al. | 220/18 |
| 2,980,281 | 4/1961 | Stewart | 312/245 |
| 3,511,386 | 5/1970 | Greenberger | 211/88 |
| 3,606,112 | 9/1971 | Cheshier | 108/143 |
| 3,684,102 | 8/1972 | Colter | 211/88 |

FOREIGN PATENT DOCUMENTS

| 275,405 | 8/1927 | United Kingdom | 211/88 |

Primary Examiner—Paul R. Gilliam
Assistant Examiner—Victor N. Sakran
Attorney, Agent, or Firm—Phillips, Moore, Weissenberger, Lempio & Majestic

[57] ABSTRACT

A truck cab caddy for holding truck and cargo documents in an orderly fashion includes means for mounting the caddy on a cab door or other surface to cooperate therewith to form an upwardly open compartment, a pencil holder dividing said compartment into segments, and an extended tray portion projecting forwardly therefrom, and display frames for registration certificates and the like mounted on the front of the caddy above the tray.

2 Claims, 3 Drawing Figures

U.S. Patent  July 11, 1978  4,099,813
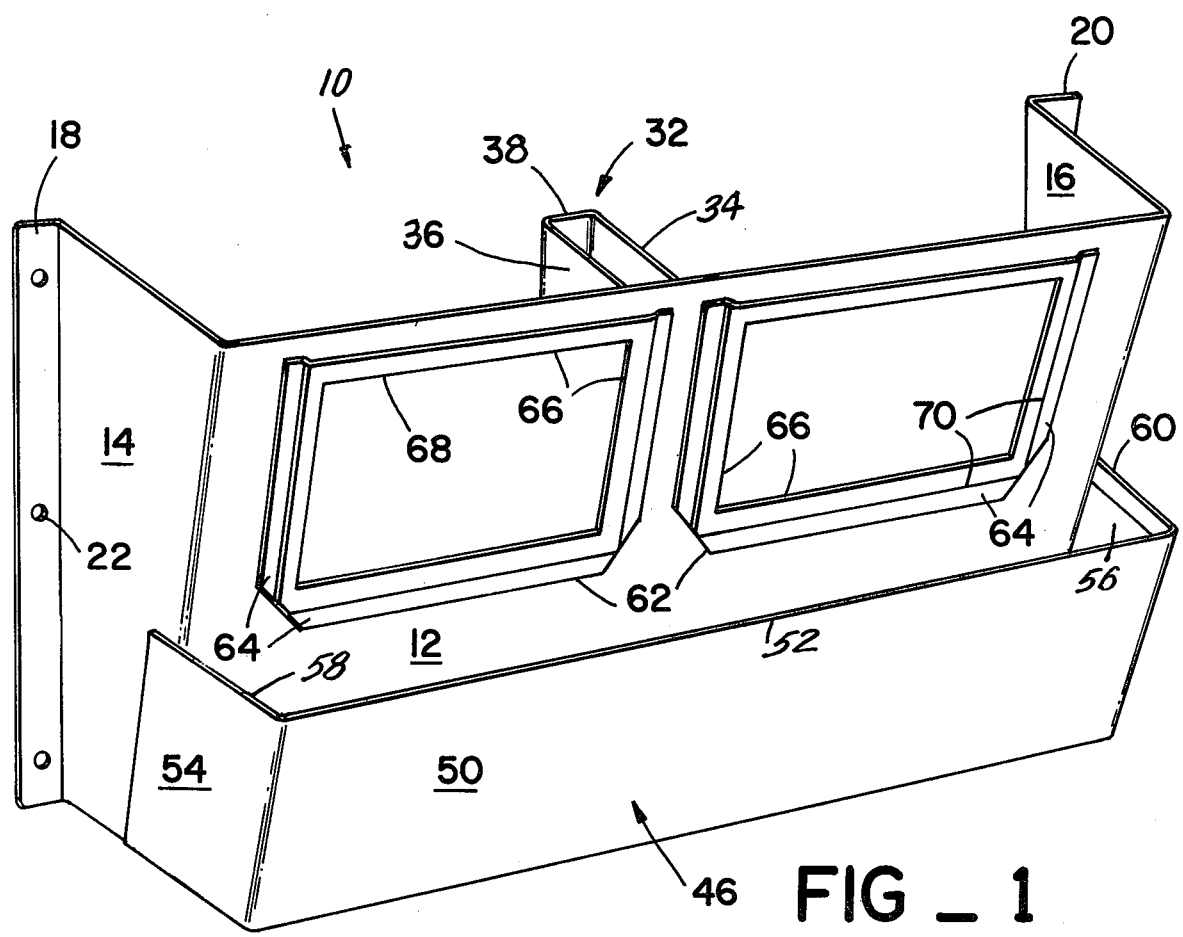
FIG_1
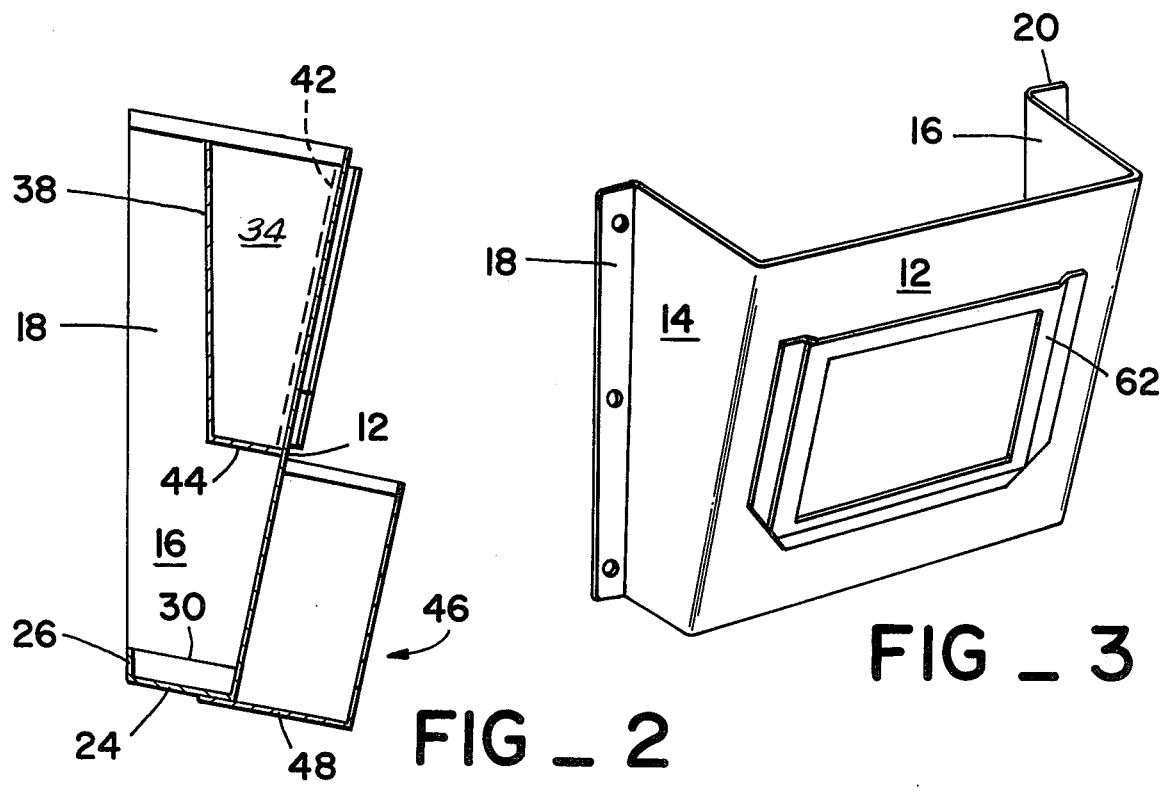
FIG_2   FIG_3

TRUCK CAB CADDY

BACKGROUND OF THE INVENTION

The present invention relates to the field of compartmentalized containers for holding pens and pencils, clipboards, registrations and certificates and other documents and effects. The device of the present invention has particular application to the trucking industry where the driver is required to carry and have readily available numerous registrations and certificates relating to his vehicle as well as bills of lading and other documents relating to the cargo carried by the vehicle. In the past adequate provision has not been made by either truck manufacturers or the accessories industry for carrying such a plurality of documents and other items in a neat and orderly manner in the truck cab. Devices have been provided for retaining miscellaneous items in automotive vehicles in various arrangements which have included small holders for clipping to a visor, box-like devices for providing on or between the seats, pouch-like bags or holders for hanging on the back of seats or on doors, and tray-like receptacles for mounting on, in front of or under dashboards. While some of these prior devices may be useable in the modern truck or tractor cab, the size and shape thereof and the manner in which they are intended to be used do not readily lend themselves for use in a truck cab of modern design, and they are not particularly designed for the primary purpose of accommodating the various documents required to be kept by the modern truck driver.

BRIEF SUMMARY OF THE INVENTION

Accordingly it is an object of the present invention to provide a device which can be easily and conveniently employed in a truck cab requiring a minimum of space while retaining maximum accessibility.

Another object of the present invention is to provide a container for holding a plurality of documents in an orderly and business-like manner whereby they can be easily retrieved when needed.

Another object of the present invention is to provide a container for a truck cab for holding documents and the like which can be easily and inexpensively constructed, but which will exhibit great durability and long life under rough and heavy use.

Still another object of the present invention is to provide a container for holding documents and the like in a truck cab which can be inexpensively manufactured but which can be constructed of materials which result in a handsome and attractive accessory.

These and other objects are achieved by the present invention which briefly comprises a holder or caddy which includes an elongated rectangular front wall member, trapezoidal end walls provided at each end thereof as by bends and apertured flanges provided on the end walls for mounting the caddy on a truck cab door or other surface in the cab of appropriate size and shape for receiving the caddy.

Provided along the lower edge of the front wall as by means of a bend therein is a bottom member having a upstanding lip formed at the rear thereof by means of an additional upward bend. Upwardly extending end tabs at the sides of the bottom member are riveted to the caddy end walls to provide a rigid closure of the bottom portion of the caddy.

Extending inwardly of the front wall near the top thereof and intermediate the end walls is a thin box-like pencil holder which serves to compartmentalize the chamber resulting from attachment of the device of the present invention to a wall by means of the apertured flanges provided on the side walls.

Mounted on the bottom member of the caddy and extending forwardly of the front wall along the entire lower portion thereof is a rectangular tray comprising a bottom plate riveted to the caddy bottom member, an upwardly extending front plate provided at the front edge of the bottom plate, and side portions at the sides of the front plate riveted to the side walls of the caddy whereby an elongated narrow tray is provided on the front of the caddy.

Also provided on the front wall of the caddy above the tray are rectangular frames for receiving and holding vehicle registration certificates and the like in full display.

All of the foregoing caddy components are constructed of laminated aluminum comprising thin aluminum sheets coated on one side by a hard enamel, and on the other side by an attractive vinyl covering, and which may be readily cut and bent to form the device of the present invention wherein all interior surfaces are enamel coated and exterior surfaces are vinyl covered.

The resulting caddy provides a finished, attractive accessory which can be simply and easily mounted on a truck cab door or other surface by means of the apertured flanges extending from the sides of the caddy and which cooperates with the surface upon which it is mounted to form a tapered, upwardly opening compartment, divided by the pencil holder provided intermediate the ends of the caddy, and which is of appropriate shape and dimension to readily receive and hold in an easily accessible manner clipboards, books, files, and other compilations of documents related to the truck and its cargo and required to be carried by the truck driver. The forward tray along the lower front of the caddy provides additional holding facility for other miscellaneous items of a wide variety and character, as well as additional documents and notes. The truck registration and other certificates may be secured and displayed advantageously in the frames attached to the outer front wall of the caddy above the tray.

BRIEF DESCRIPTION OF THE DRAWINGS

FIG. 1 is a perspective view of a truck cab caddy constructed in accordance with the present invention, FIG. 2 is a side elevation and section of the truck cab caddy shown in FIG. 1 and FIG. 3 is a perspective view of an alternative embodiment of the present invention.

DESCRIPTION OF THE PREFERRED EMBODIMENTS

A truck cab caddy 10 constructed in accordance with the present invention is shown in FIG. 1 and comprises a rectangular front wall 12 having trapezoidal side walls 14 and 16 provided at each end thereof at right angles thereto along the entire ends of the front wall. Provided at the rear edges of the side walls are apertured, coplanar flanges for mounting the caddy of the present invention upon a planar surface by means of screws, bolts or other suitable fastening means through holes 22 provided in the flanges. The top edges of front wall 12 and side walls 14 and 16 are folded over to form a rim or bead to avoid exposed rough or sharp edges.

As mentioned, the side walls of the caddy are trapezoidal with the upper edges greater than the bottom edges whereby upon mounting of the caddy upon a vertical planar surface by abutment of flanges 18 and 20 thereagainst, front wall 12 and side walls 14 and 16 will provide a upwardly-opening compartment therewith wherein the front wall 12 will be inclined outwardly to facilitate insertion and removal of documents and document files including books, clipboards and notebooks into the compartment formed thereby.

Joined to front wall 12 along the entire lower edge thereof is a bottom member 24 which extends rearwardly thereof to the plane defined by flanges 18 and 20 where it terminates in an upwardly extending lip 26 along the back edge thereof. At each side edge of bottom member 24 is an upwardly extending tab 28 and 30 respectively which are riveted to side walls 14 and 16 respectively.

Intermediate the end walls of the caddy and preferably at the midpoint of front wall 12 a pencil holder 32 extends inwardly of the front wall and serves to divide the chamber behind the front wall of the caddy into two sections.

The pencil holder includes spaced parallel trapezoidal side walls 34 and 36 joined by a back wall 38, and being provided at their front edges by flanges 40 and 42 whereby the pencil holder is riveted to the front wall. A bottom tab 44 extends from the lower edge of one of side walls 34 and 36 toward the other of said side walls to form a bottom closure of the pencil holder 32. The pencil holder preferably does not extend to the plane defined by flanges 18 and 20 to allow the entire length of the caddy to be utilized for large documents if necessary. Due to the incline of the front wall, smaller documents placed within either section of the caddy will lay forwardly against the front wall and thus be separated by the pencil holder.

Riveted to bottom member 24 and extending forwardly of the caddy front wall is a tray 46 comprising a bottom plate attached to bottom member 24 and overlying a parallel relationship with a portion thereof and extending forwardly of front wall 12, and having a front plate 48 attached to the front edge thereof and extending upwardly therefrom in front of and spaced from the lower portion of front wall 12, and terminating in a rim or bead 52 provided along the upper edge thereof. Joined to plate 50 at each side thereof as by bends are side plates 54 and 56 which extend rearwardly to and over a portion of sidewalls 14 and 16 respectively to which they are riveted. Like front plate 50, side plates 54 and 56 terminate their edges in a folded rim or bead 58 and 60 to provide a smooth exposed edge.

Riveted to the front wall 12 above tray 46 are frames 62 having bottom and side peripheral flanges 64 secured to front wall 12, and borders 66 defined by rectangular openings 68 joined to flanges 64 by stepped portions 70. Since no flanges or stepped portions are provided at the top of the frame, vehicle registration certificates and other documents may be inserted in the space between front wall 12 and the borders of the frames to securely hold registration documents for permanent keeping and viewing through openings 68.

An alternate embodiment of the present invention is shown in FIG. 3 and comprises a caddy constructed as described with respect to the embodiment shown in FIGS. 1 and 2, but omitting pencil holder 28 and tray 46, and further providing a single frame 62 on front wall 12, which is shortened to provide a smaller caddy.

As previously indicated, a caddy constructed as described above and having a pleasing and attractive finish can be made using laminated aluminum which is readily available and well-known in the trade. Laminated aluminum comprises thin sheets of aluminum having one side coated with enamel and the other side covered with a vinyl covering having any desired design.

The front wall, side walls, apertured flanges, bottom member and lip of the caddy can be made from a single sheet of such laminated aluminum by appropriate cutting and beading thereof. The pencil holder and the lower tray can also each be constructed of single sheets of this material, and upon construction of the caddy described above, all resulting outward surfaces will be covered with the vinyl covering selected, investing the caddy with an attractive outer surface. Likewise all interior surfaces will be enamel coated to provide a smooth clean interior caddy surface.

Moreover, the caddy components may be easily secured together by riveting, making construction of the caddy of the present design easy and inexpensive.

What is claimed is:

1. A cab caddy for holding documents and the like comprising a first sheet of material formed to provide a compartment in cooperation with a surface it is mounted on, including front wall, trapezoidal side walls joined to each end of the front wall by right angle bends in said material rearward of the front wall, flanges provided at rear edges of side walls by bend means in the material, a bottom member joined to the bottom edge of the front wall by bend means and extending rearwardly thereof to a plane defined by said flanges, a lip joined to the rearward edge of the bottom member by bend means and extending upward therefrom coplanar with the flanges, tab members joined to side edges of the bottom member by bend means and extending upward therefrom parallel with and interiorly adjacent the trapezoidal side walls, fastening means securing the tab members to the side walls, a second sheet of material formed to provide a tray extending forward of said compartment and including a front portion in spaced parallel relationship forwardly of and coterminous with a lower portion of the front wall, side portions joined to ends of the front portion by bend means and extending rearwardly thereof in parallel overlapping part way relationship with the side walls, a bottom portion joined to the lower edge of the front portion by bend means and extending rearwardly thereof in parallel overlapping part way relationship with the bottom wall, fastening means securing the side portions to the side walls, and the bottom portion to the bottom wall, a pencil holder secured to the inner surface of the front wall intermediate the side walls and extending rearwardly thereof whereby the compartment will be divided by said pencil holder into respective chambers, said pencil holder comprising a third sheet of material formed to include spaced parallel walls extending rearwardly of the front wall parallel with the side walls, a transverse rear wall joined to the rearward edges of the side walls by bend means, flanges parallel to and abutting the front wall joined to the front edges of the parallel walls by bend means, bottom tab joined to the bottom of one of said parallel walls by bend means and extending normal thereto to said other parallel wall, fastening means securing the flanges to the front wall, at least one document frame, secured to said front wall, said document frame comprising side and bottom flange means secured to said front wall, border means defined by rectangular openings, and stepped portions joining said border means with said flanges.

2. The truck cab caddy of claim 1 wherein said caddy is constructed of aluminum sheets having one side coated with enamel and the other side covered with vinyl covering, and wherein said caddy is constructed whereby all interior surfaces are enamel coated and all exterior surfaces are vinyl covered.

* * * * *